(12) United States Patent
Goodman et al.

(10) Patent No.: US 6,370,646 B1
(45) Date of Patent: Apr. 9, 2002

(54) METHOD AND APPARATUS FOR MULTIPLATFORM MIGRATION

(75) Inventors: Greg Goodman; Jon Walker; Scott Messier, all of Santa Barbara, CA (US)

(73) Assignee: Miramar Systems, Santa Barbara, CA (US)

(*) Notice: Subject to any disclaimer, the term of this patent is extended or adjusted under 35 U.S.C. 154(b) by 0 days.

(21) Appl. No.: 09/504,638

(22) Filed: Feb. 16, 2000

(51) Int. Cl.$^7$ ................................................. G06F 9/00
(52) U.S. Cl. ....................................................... 713/100
(58) Field of Search .................... 713/1, 100; 717/11

(56) References Cited

U.S. PATENT DOCUMENTS

| 5,497,490 A | | 3/1996 | Harada et al. |
|---|---|---|---|
| 5,499,357 A | * | 3/1996 | Sonty et al. ................ 710/104 |
| 5,678,044 A | | 10/1997 | Pastilha et al. |
| 5,771,381 A | | 6/1998 | Jones et al. |
| 5,832,274 A | * | 11/1998 | Cutler et al. ................ 395/712 |
| 5,835,087 A | | 11/1998 | Herz et al. |
| 5,850,545 A | | 12/1998 | Matsushita |
| 5,913,040 A | | 6/1999 | Rakavy et al. |
| 5,996,073 A | | 11/1999 | Lee et al. |
| 6,073,119 A | | 6/2000 | Bornemisza-Wahr et al. |
| 6,091,411 A | | 7/2000 | Straub et al. |
| 6,105,063 A | | 8/2000 | Hayes, Jr. |
| 6,110,229 A | | 8/2000 | Yamaguchi |
| 6,151,608 A | * | 11/2000 | Abrams ....................... 707/204 |
| 6,161,176 A | | 12/2000 | Hunter et al. |
| 6,182,212 B1 | | 1/2001 | Atkins et al. |
| 6,202,206 B1 | | 3/2001 | Dean et al. |
| 2001/0003835 A1 | | 6/2001 | Watts |

FOREIGN PATENT DOCUMENTS

| WO | WO 99/50743 | 10/1999 |
|---|---|---|
| WO | WO 00/60488 | 10/2000 |
| WO | WO 00/65438 | 11/2000 |
| WO | WO 00/68816 | 11/2000 |
| WO | WO 00/70445 | 11/2000 |

OTHER PUBLICATIONS

"PC Transplant Pro", Altiris brochure, 2pgs. (2000).

\* cited by examiner

*Primary Examiner*—Dennis M. Butler
(74) *Attorney, Agent, or Firm*—Townsend and Townsend and Crew LLP; Philip H. Albert; Fidel D. Nwamu

(57) ABSTRACT

A method and system for migrating a computing environment from a source computing platform to a destination computing platform. A script defines at least one software system or application stored on the source computing platform. The script is parsed by a scripting engine to resolve specific user-selectable settings of each source software system or application. Genetic data is generated to represent the resolved settings of the source software systems and/or applications. The genetic data is then selectively applied to corresponding software systems or applications stored on the destination computing platform to automatically provide similar settings thereon.

21 Claims, 6 Drawing Sheets

METHOD AND APPARATUS FOR MULTIPLATFORM MIGRATION

BACKGROUND OF THE INVENTION

The present invention relates to computer network systems. More particularly, the present invention relates to a novel and improved system and method for migrating software applications, files, settings, and configurations thereof from one computer platform to another.

The personal computer, or "PC," has become an ubiquitous tool in personal and business life. However, as PC technology continues to rapidly evolve, almost every PC user will, at some point in time, have to upgrade from one computer system to another, usually more advanced computer system. The reasons for upgrading a computer system are varied, and include improved processor speed and capacity, improved and increased memory, and new, improved applications with increased functionality.

As used herein, the term "system" relates to high-level software used to operate and maintain a computer platform, including the operating system and utility programs. The term "application" relates to a computer program product employed on a computer platform to perform a specific applied function, as distinguished from system-wide functionality.

For example, WINDOWS™ is an operating system promulgated by Microsoft Corporation, and is employed in nearly eighty percent of personal computers used today. At every few years, Microsoft releases an upgraded version of WINDOWS™ with enhanced capabilities and increased functionality. However, many of the core functions will remain the same.

Systems and applications allow for a high degree of user customization, whereby a user will tailor system and application software to the user's specific computing environment. In one example, a user might customize a dictionary for use with a particular word processing application. Customization can be an exhaustive process where most attributes to be customized must be done so manually.

Normally, when software is migrated from one computing platform to another, or when a user has upgraded a computing platform with a newer version of already-installed software, most or all of the customizations performed on the old platform or version must be manually reaccomplished. Upgrading or migrating computer software is usually a time-consuming, elaborate procedure. In large institutions, where global upgrades of large computing networks are common, the upgrading or migrating process can become extremely expensive.

Thus, as can be seen from the above discussion, there is a need for a method and system whereby upgrades and migrations may be made without requiring manual reaccomplishment of customizations. Such a method and system can reduce man-hours and time involved in software migratory endeavors. Further, there is a need for greater user control of the migration process.

SUMMARY OF THE INVENTION

The present invention provides a method and system for performing automatic mass migration of a computing environment from a source computing platform to a destination computing platform. In one embodiment of the present invention, a method of migrating includes the steps of deriving at least one script that defines at least one software system or application stored on the source computing platform, parsing the script to resolve specific user-selectable settings of the at least one software system or application, generating genetic data representing the resolved settings of the at least one software system or application, and selectively applying the genetic data to a corresponding software system or application stored on the destination computing platform to automatically provide similar settings thereon.

In another embodiment of the present invention, a computing environment migration system includes a network including a source computing platform and a destination computing platform, and a migration utility resident on the network and responsive to user inputs. The migration utility is configured to locate and electronically connect, via the network, the source computing platform to the destination computing platform. Further, the migration utility is configured to derive at least one script that defines at least one software system or application stored on the source computing platform, parse the script to resolve specific user-selectable settings of the at least one software system or application, generate genetic data representing the resolved settings of the at least one software system or application, and selectively apply the genetic data to a corresponding software system or application stored on the destination computing platform to automatically provide similar settings thereon.

In yet another embodiment of the present invention, a system for describing a computing environment for migration over a network includes at least one script that defines a software system or application and includes instructions for identifying the defined software system or application, and settings thereof, and a script engine running the at least one script. The script engine is configured to scan a storage area of the source computing platform according to the instructions, and represent the defined software system or application, and settings thereof, as a genetic data file.

In still yet another embodiment of the present invention, a computer program product includes program code for defining processes of displaying a view of a space on the display coupled to the computer system, accepting signals from the user input device coupled to the computer system, the signals specifying a destination computing platform and a source computing platform, and deriving at least one script that defines at least one software system or application stored on the source computing platform. Further, the computer program product includes program code defining processes of parsing the script to resolve specific user-selectable settings of the at least one software system or application, generating genetic data representing the resolved settings of the at least one software system or application, and selectively applying the genetic data to a corresponding software system or application stored on the destination computing platform to automatically provide similar settings thereon. The computer program product may be stored on a computer-readable medium.

In still yet another embodiment of the present invention, a method of migrating a computing environment from a source computing platform to a destination computing platform, includes the steps of retrieving a registry of settings for software applications on the source computing platform selected for migration, and storing the registry on the destination computing platform.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DESCRIPTION OF THE SPECIFIC EMBODIMENTS

Figure 1:
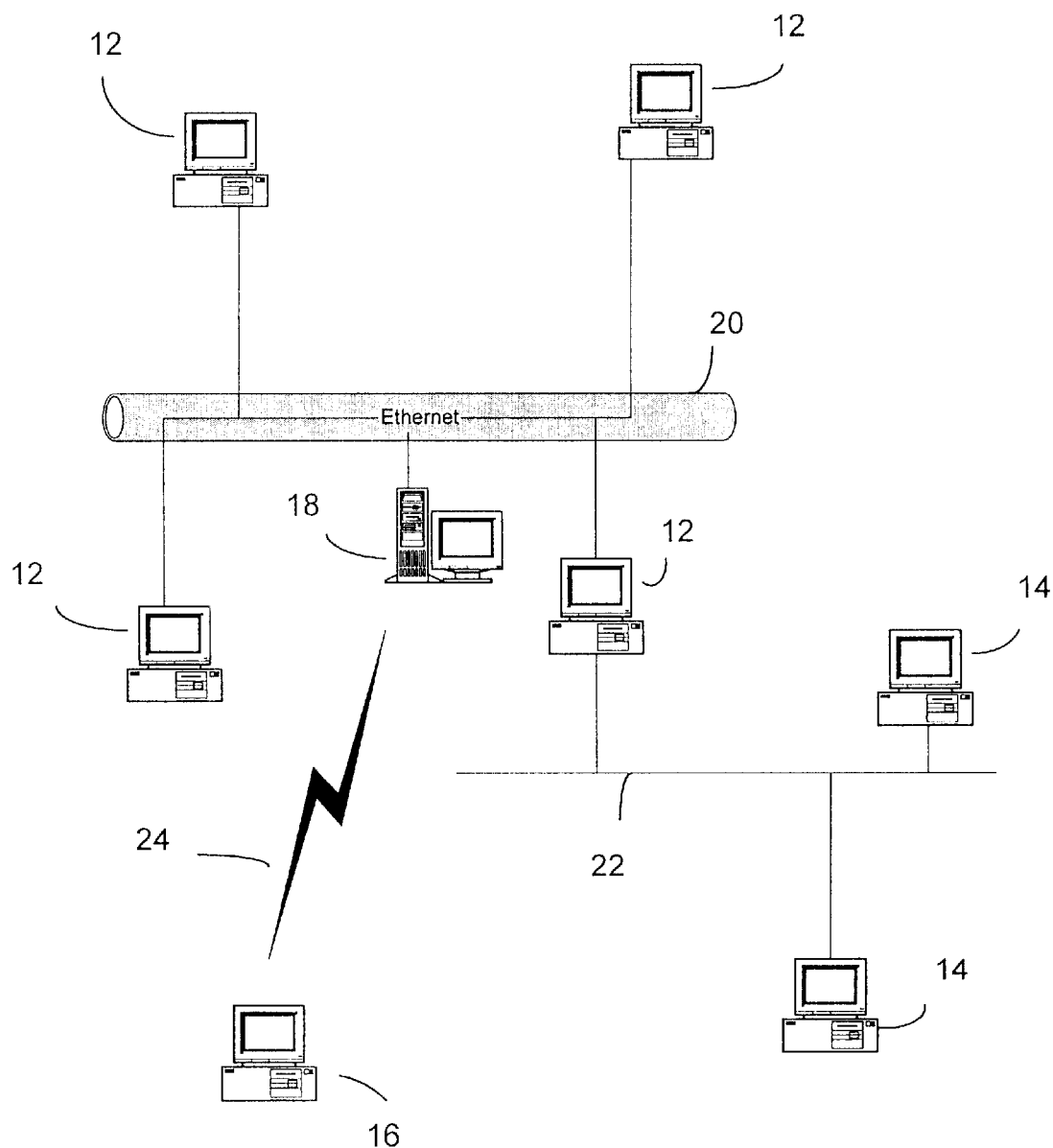
FIG. 1 is a simplified block diagram of a computer network infrastructure suitable for use with the present invention.
Figure 2:
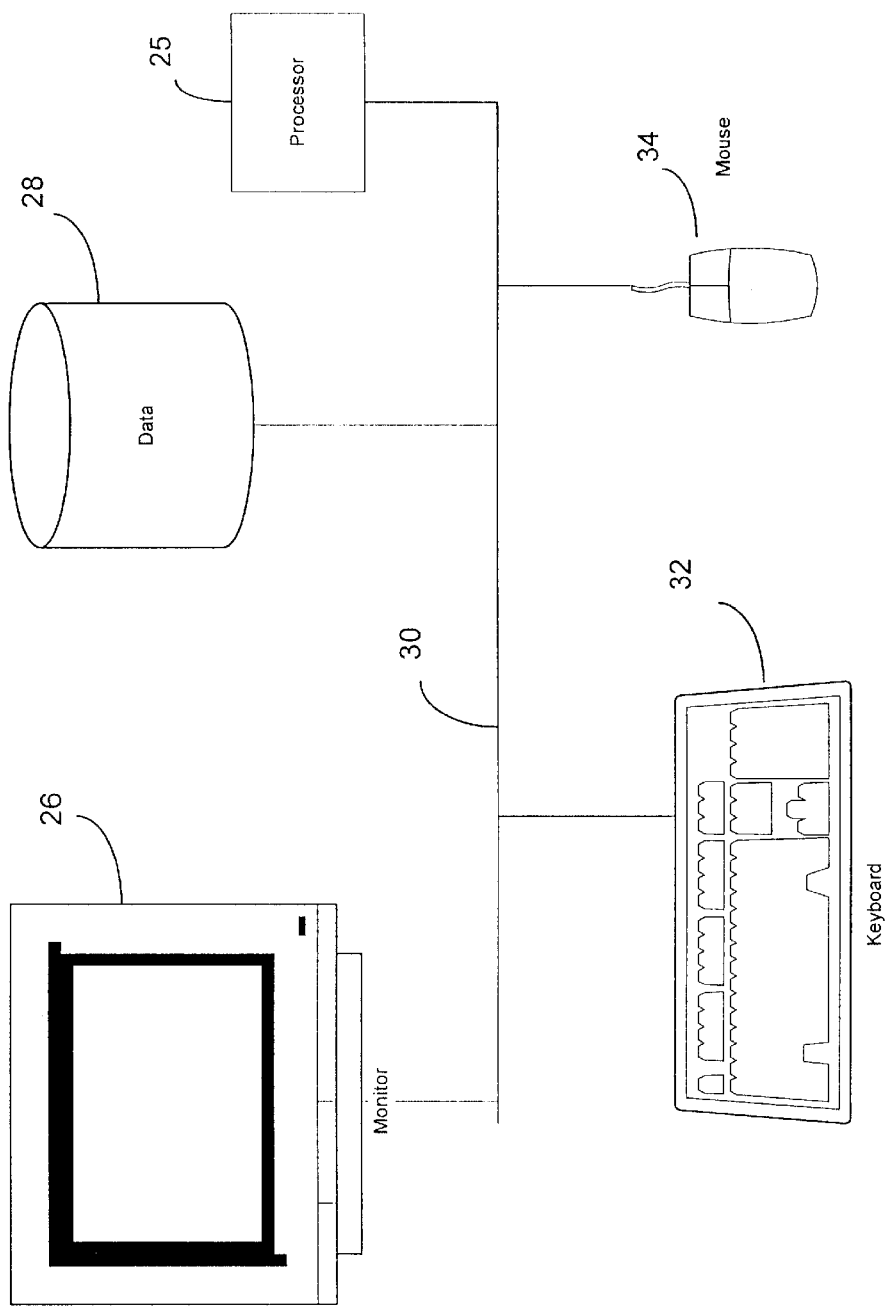
FIG. 2 is a simplified block diagram of a computing platform suitable for use with the present invention.

FIG. 1 is a simplified block diagram of a computer network infrastructure 10 suitable for use with the present invention. Multiple computing platforms 12 are interconnected by a network, such as an Ethernet network 20. Other multiple computing platforms 14, which may be different from computing platforms 12, are also interconnected by a network 22, which may have a data bus different from an Ethernet network 20. In a preferred exemplary embodiment of the present invention, the computer network supports TCP/IP network communication protocol across the networks 20, 22. Also, there may be computing platforms 16 that are not interconnected with the other platforms, but may be communicatively coupled by an alternative communications medium 24. Network operations of a computer network such as that shown in FIG. 1 may be controlled by a server platform 18, for example. The server platform 18 may include large amounts of database memory that stores computer programs for managing the operation and configuration of the computing platforms and the network 10. Computer programs employed to manage computing systems are known as "utilities." In a specific exemplary embodiment, the migration method and system of the present invention is embodied in a utility program stored on the server or other managing platform of the network 10. With reference to FIG. 2, there is shown a computing platform 12 suitable for use in hosting and executing an exemplary embodiment of the present invention. The computing platform 12 includes a local data bus 30 that connects a processor 25 with a display monitor 26 and database memory 28. The database memory includes multiple memory locations, and may employ a database management system, such as a relational database management system (RDBS) to manage data input and stored in the memory locations. Also connected to the platform via the bus 30 are user input devices, such as a keyboard 32 and/or a mouse 34. The user input devices allow for user interaction with the present invention, as will be explained in greater detail below.

All computing platforms include a computing environment, the term of which relates herein as the general systems, applications, folders and files resident on, or in communication with, the computing platform. Further, every computing environment has its own "personality," the term of which is used herein to relate to specific systems, applications, folders and files, and additionally to settings, customizations and configurations thereof. The personality of the computing environment may be defined, for example, by "genetic data," a term which relates herein to a set of data that describes a specific personality of a computing environment which may be applied to one or more computing platforms, and which may be generated according to one or more "scripts," explained in greater detail below.

Figure 3:
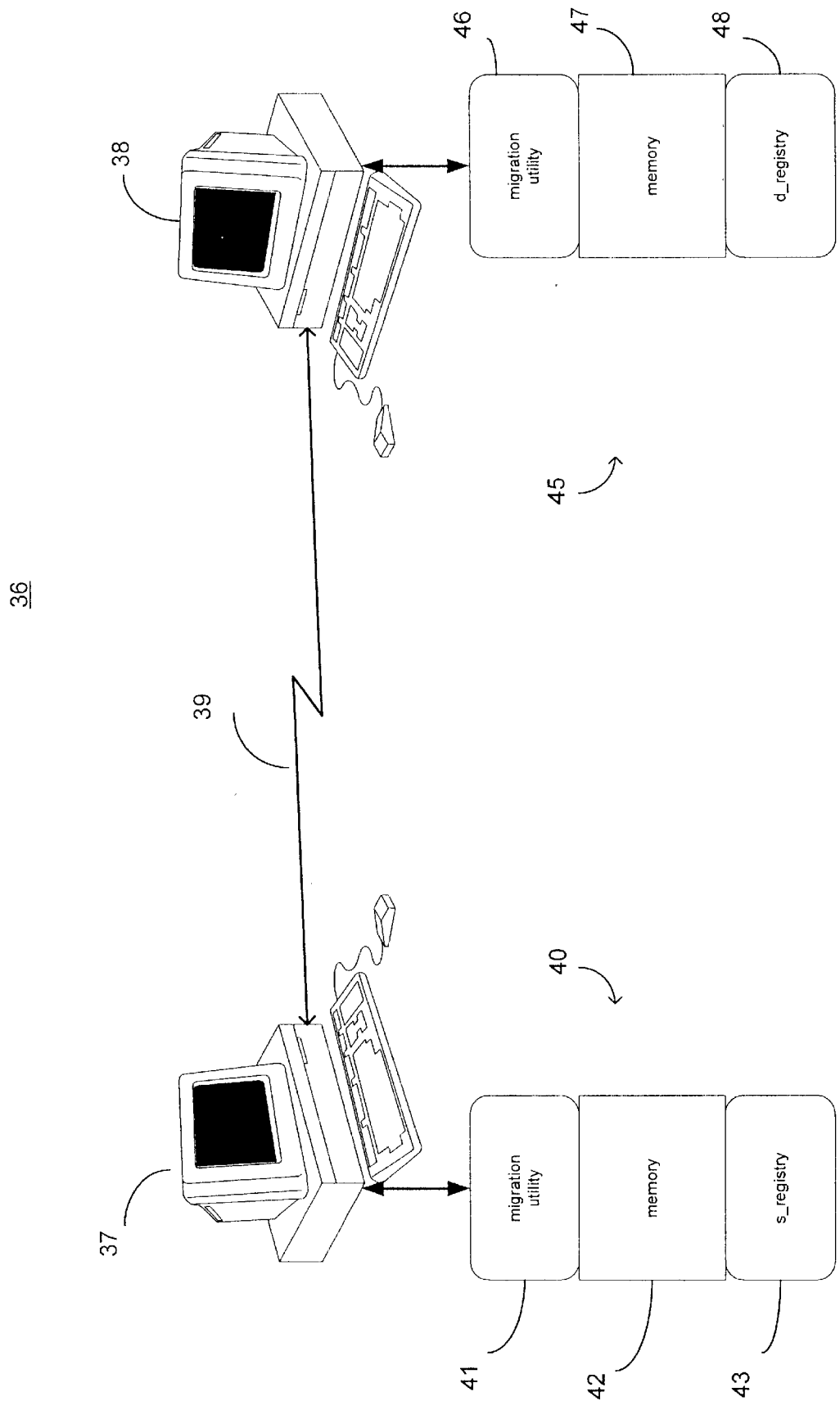
FIG. 3 is a simplified block diagram of a computer network to illustrate a method of migrating a computing environment according to one embodiment of the present invention.

FIG. 3 is a simplified block diagram of a computing network 36 to illustrate a method of migrating a computing environment according to one embodiment of the present invention. The network includes at least one source computing platform 37 and at least one destination computing platform 38. The source and destination computing platforms are linked by a communication medium 39 that may be, for example a local area network connection, dedicated hardware communication line, wireless link, or even by transferring a computer-readable media from the source computing platform to the destination computing platform.

The source computing platform has a computing environment 40, which includes all of the software systems, applications and settings that are stored in a memory 42, for example. Specific settings related to the source computing platform may be accessed from the memory via a source registry 43, denoted here as S_REGISTRY. According to the present invention, a migration utility 41 is a part of the computing environment and has access to the memory 42 and registry 43. Likewise, the destination computing platform includes a computing environment 45, which includes a memory 47 and a registry 48, denoted as the D_REGISTRY. Each registry includes paths and keys to identify the systems, applications, and settings of the computing platform on which they reside. The memory may be a magnetic hard disk drive, for example, or any other non-volatile computer-readable medium such as a removable disk drive or optical disk drive.

In one embodiment of the present invention, the migration utility is loaded on both the source and destination computing platforms. The migration utility 41 of the source computing platform retrieves the S_REGISTRY of source computing platform settings from registry 43 for communication to and storage in the registry 48 of the destination computing platform. In an embodiment, the S_REGISTRY settings are selectively chosen for migration. In an alternative embodiment, the entire S_REGISTRY is migrated to the destination computing platform, and selectively applied to corresponding registry 47 settings. The S_REGISTRY settings are applied to the destination computing platform to either supplant or augment the destination settings, a selection which may be provided to a user by either the source or destination migration utility.

Figure 4:
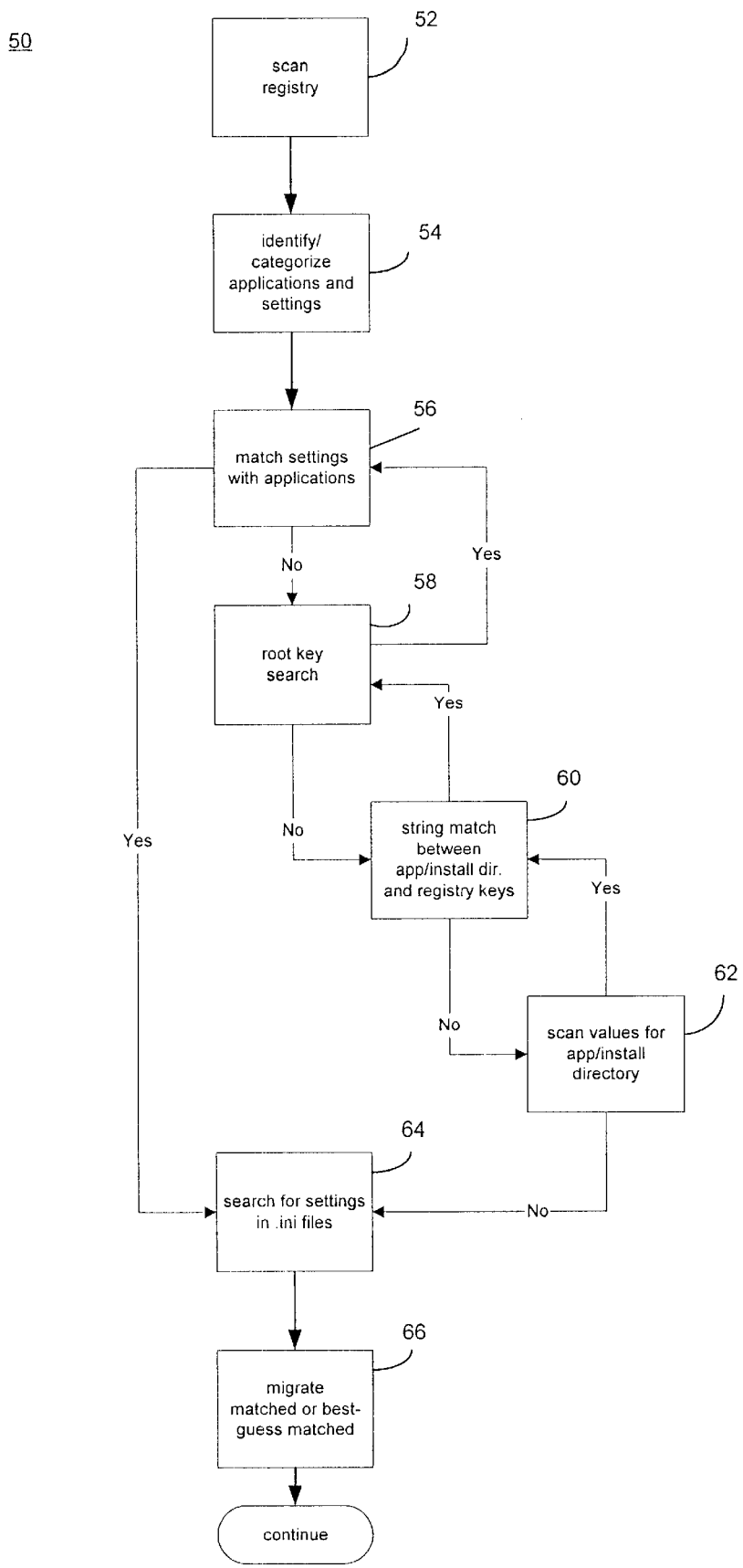
FIG. 4 is a flow diagram illustrating a method of migrating a computer environment according to an embodiment of the present invention.

FIG. 4 is a flow diagram that illustrates a method 50 of migrating a computing environment according to an embodiment of the present invention. The method is preferably executed by the migration utility resident on the source computing platform, but may also be executed by a processor running general program code instructions stored in a memory, for example. At step 52, the registry and the hard drive are scanned for applications and application settings that will be migrated to a destination computing platform. Applications and application settings are identified at step 54, and categorized according to their location on the desktop system of the computing platform, for example. At this step, the applications and the settings may also be examined for shortcuts to their respective locations. At step 56, the identified settings are matched with their applications to define the source computing platform "personality" or genetic data.

According to one embodiment of the invention, in the event that the settings and applications are not easily matched, a matching algorithm will be employed that scans the registry for data that is well-known to persons skilled in the art, but not easily provided for identifying files for migration. First a search is performed at step 58, whereby the registry is scanned for keys that provide information about the application configurations of installed software. Keys that are identified by this search are tagged as root keys for one or more applications. If search step 58 fails, a scan is done to identify application names and the directories in which they are installed on the local machine. A string match is executed at step 60 between the application name/install directory and specific keys to determine if they are related. If both steps 58 and 60 are not successful for identified applications, then at step 62 the registry is scanned for values that contain the application name and or install directory. Once a relevant value is found, the process examines the parent keys of the value to determine the root key for this application, in order to match each setting with an application.

For all applications that were identified in step 54, including those whose settings were not matched in step 56, at step 64 the hard drive is searched for settings in ".ini" files that are located in the same directory as identified applications, or for files having a name that contains a portion or all of the application name. At step 66, all applications are migrated. Applications being matched with their settings from the registry are provided for migration. As such applications are migrated, settings and files are examined for paths to files that may be relocated during the migration. If such a path is found the path is then mapped to the new location by identifying the source location and converting the portion of the path that must be relocated to the target location. Those settings and applications that are not matched are optionally provided for migration by copying over all remaining settings in the registry, .ini files, and directories that contain executable files.

Bulk transfers of data may be executed according to the method 50 presented above, or may be migrated wholesale by moving all data files that are not included in the applications identified above in step 54. In an alternative embodiment, data files may be migrated by retrieving known extensions for the registry, and migrating all files that match the retrieved known extensions.

Figure 5:
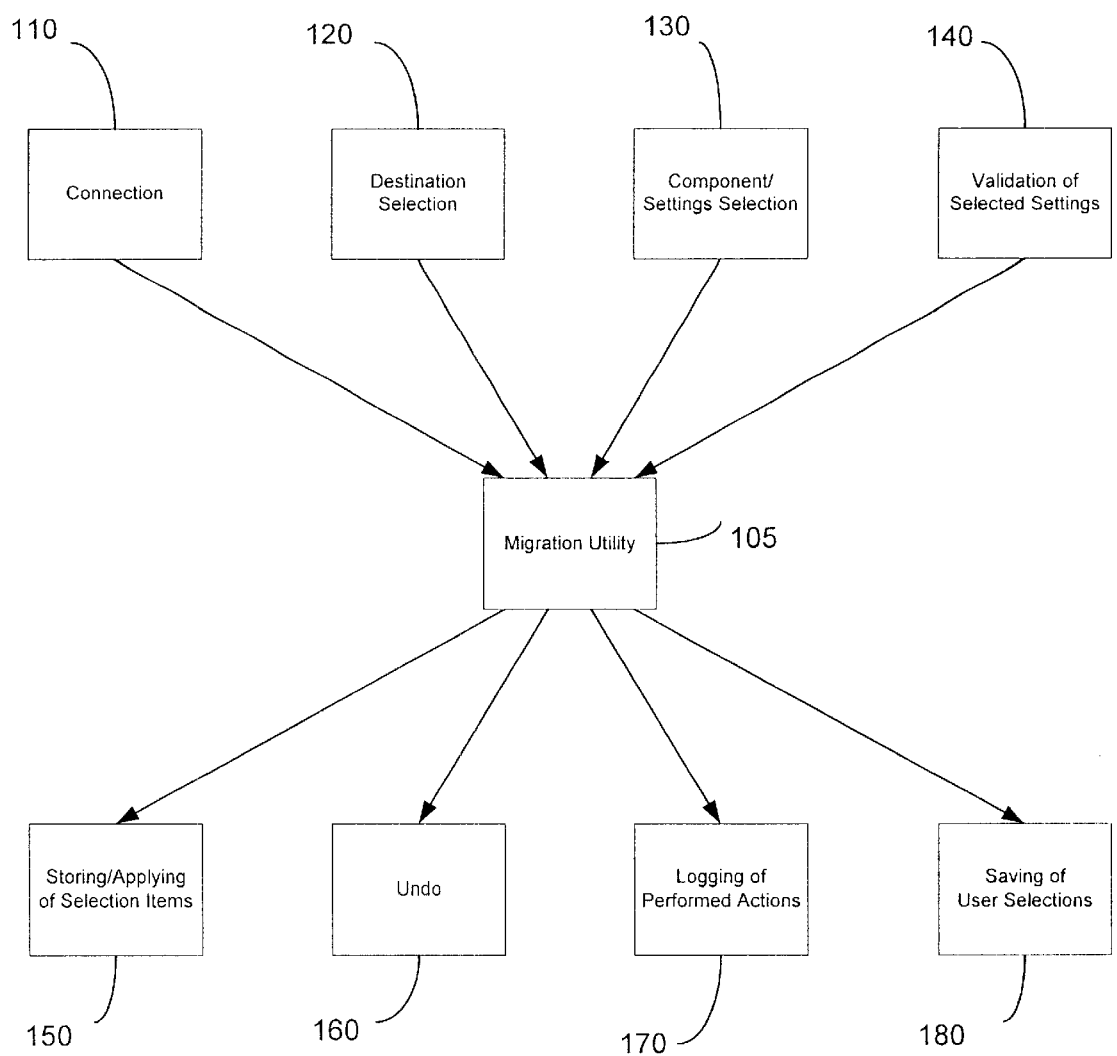
FIG. 5 is a functional block diagram illustrating a computer environment migration system according to an embodiment of the present invention.

FIG. 5 is a functional block diagram illustrating a migration system 100 according to an embodiment of the present invention. In an embodiment of the invention, the migration system is a migration utility resident on a network for download into a computer platforms identified as either the source or destination computer platforms, for example. In an alternative embodiment, the system is embodied in program code resident in a computer platform memory, that directs a processor of the platform to perform the specific migration functions according the present invention. Each function block of FIG. 5 is described in detail below.

The migration system 105 includes a connection block 110. The connection block provides for the interconnectivity to a network, for example, or allows a user to configure a particular computing platform as a source. Block 120 allows a user to select at least one other computing platform as a destination. The destination computing platform may be connected to the source computing platform via a network interface, such as in a local area network or wide area network, for example, or may be interconnected by the Internet. Or, block 120 may be bypassed if there is no destination selected, or if a chosen computing platform is not connected to the selected source computing platform.

Block 130 relates to selection of components and settings, of applications and systems, for example, for migration from the source to a destination computing platform. In one embodiment, the block is implemented as a SETTINGS function, whereby a graphical user interface solicits a user input to determine a "personality" of a source computing environment and a destination computing environment, on which the source computing personality will be applied. The interface may list system settings in the source computing environment, including a list of any system-level software, for migration to a destination computing platform. A user will select applications for migration, as well as settings (customizations, configurations, etc.) of the applications. Entire files and folders may also be selected for migration. In one embodiment, the present invention includes a filter and search tool, whereby system settings, applications, files and folders may be sought according to user-specified search or filter criteria. The search or filter criteria can include file type, name, memory location, date of creation or last edit, size, or any combination thereof.

In an exemplary embodiment, a user interface screen is provided with a SETTINGS tab within the standard WINDOWS interface. Upon actuation of the SETTINGS tab the screen will display a graphical representation of attributes that make up the personality of the computing platform being examined. A user using an input device will interact with the screen to select (or deselect) system settings, such as "wallpaper," for example, applications, and application settings, such as customized toolbars. In a specific embodiment of the system, the screen includes a display of a "tree" with checkboxes in which users can, with a peripheral input interface such as a mouse or keyboard, place a graphical check mark to select or remove a check mark to deselect specific attributes of the source computing environment. Each of the selected attributes and settings may be saved in a migration file for migration, or a user-customizable "DNA profile" for migration for subsequent reapplication to another destination computing platform.

Block 140 provides a validation function by which a user may confirm or validate those settings and attributes selected and tagged for migration. Each of blocks 110, 120, 130 and 140 provide data to the migration utility, and on which the migration utility may perform certain other functions. Blocks 150, 160, 170 and 180 represent an execution or an output provided by the migration system according to the present invention.

Block 150 provides a function to either store all selected and/or validated settings for source computing platform software systems and applications, or apply the settings to a destination computing platform. Block 150 allows a user to undo an executed step of applying the source computing environment to a destination computing platform, essentially backing out of the operation to restore the destination computing environment to its pre-application state. A log of all selections, activities, steps and settings may be kept in block 170. In block 180, all of the settings illustrated in the top row of function blocks may be saved or stored as a profile of the source computing environment, e.g. an outline of all user-selectable settings selected for migration, which may be applied in the future to new destination computing platforms, or stored in a memory for future access.

Figure 6:
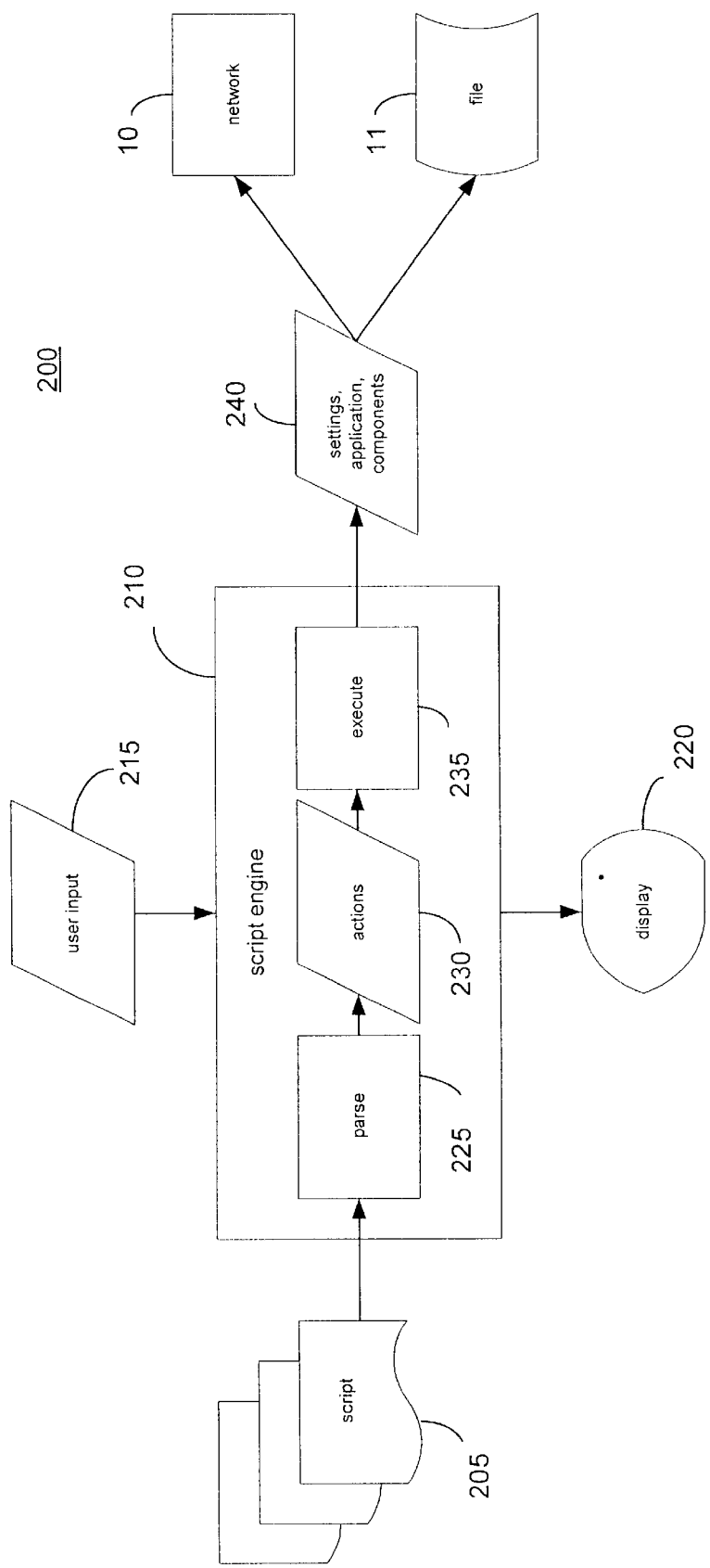
FIG. 6 is a functional block diagram illustrating a scripting engine according to an embodiment of the present invention.

FIG. 6 illustrates a migration system 200 including a scripting engine 210 according to one embodiment of the invention. The scripting engine runs one or more scripts 205. In one embodiment, a script is a computer-readable set of instructions configured to cause a computing system to draw information system and application information from a source computing platform. In another embodiment, a script is a set of data that represents a specific system or application. At least one script is derived for each system or application that may be stored on the source computing platform. Each script is written, for example, according to a scripting language that provides a user an ability to customize and adapt the script to a specific version of a system or application. In one example of the present invention, a script is provided for the top-most commonly used Microsoft Windows™ applications, including MS Office, Netscape Navigator, and MS Excel, for example. Thus, if an enterprise were to customize applications on its network, for example, the script for each application may be modified to capture the customizations employed.

In an exemplary embodiment of the present invention, scripts are divided at least among systems and applications to capture the unique user-selectable settings thereof. The systems setting script, for example, includes desktop, network, printer and drive settings. Applications settings include preference settings, tool settings, customizations for dictionary or thesaurus, and document format settings. A different script may be written for each supported application.

Each script 205 is run by the scripting engine 210. The scripting engine may be part of the migration utility, and may be embodied in software or hardware, or a combination of hardware and software. For example, the scripting engine may be a computer processor that operates according to instructions and scripts embedded in executable software code. Thus, all or part of the scripting engine may be transmitted across network communication media, or downloaded from a central location, such as an internet Web site, for example. The scripting engine parses each script with a parsing tool 225. The parsing tool isolates specific portions of a script to resolve specific user-selectable settings on the system or application represented by the script.

The scripting engine is responsive to user inputs 215. In one exemplary embodiment of the present invention, a user is presented with a "Wizard" environment; i.e. an interactive graphical display that solicits inputs from a user and directs the activities of the invention toward a desired set of actions 230 depending on such solicitations. In this way, the user is offered a simple graphical representation of a computing environment on a computing platform from which to select applications, custom settings, and files to be transferred, for example. According to this exemplary embodiment, the Wizard provides an interface between the user and the scripting engine. The Wizard accepts user inputs 215 via a keyboard or mouse, for example, and translates the user inputs into commands that direct the scripting engine to perform desired actions 230.

The actions are then executed by the scripting engine at block 235. Specific settings, applications and components 240 of the source computing environment are output from the scripting engine. The settings, applications and components may then be transmitted to the network 10, as described above, or may be stored in a file 11 for sharing or copying to another system later. The components may include data representing a comprehensive history of actions 230 and user inputs 215, exceptions applied from scripted options, error logs, and a registry of settings. The components may also be used for selectively undoing any action taken by the scripting engine.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of migrating a computing environment from a source computing platform to a destination computing platform, the method comprising the steps of:

deriving at least one script that defines at least one software system or application stored on the source computing platform;

parsing the script to resolve specific user-selectable settings of the at least one software system or application;

generating genetic data representing the resolved settings of the at least one software system or application; and selectively applying the genetic data to a corresponding software system or application stored on the destination computing platform to automatically provide similar settings thereon.

2. The method according to claim 1, further comprising the steps of:

deriving at least one script that defines at least one software system or application on the destination computing platform;

comparing the destination script with the source script for a corresponding software system or application; and generating differential data that describes differences in user-selectable settings on the software system or application between the destination computing platform and the source computing platform.

3. The method according to claim 2, further comprising the step of selectively migrating certain individual systems or applications from the source computing platform to the destination computing platform based on the destination script data.

4. The method according to claim 1, wherein the step of deriving a script further includes the steps of searching a memory of the source computing platform for a particular software system or application defined by a user; and selecting the particular software system or application for migration if the particular software system or application exists on the source computing platform.

5. The method according to claim 1, further comprising the step of storing the genetic data as a file in a memory.

6. The method according to claim 5, further comprising the steps of:

retrieving the file from the memory; and extracting the genetic data from the file, wherein the genetic data is manipulable to reflect upgrades in the at least one software system or application.

7. The method according to claim 1, further comprising the step of electronically transmitting the genetic data over a network connecting the source computing platform with the destination computing platform.

8. A system for migrating a computing environment, comprising:

a network including a source computing platform and a destination computing platform; and a migration utility resident on the network and responsive to user inputs, wherein the migration utility is configured to locate and electronically connect, via the network, the source computing platform to the destination computing platform, the migration utility being further configured to derive at least one script that defines at least one software system or application stored on the source computing platform, parse the script to resolve specific user-selectable settings of the at least one software system or application, generate genetic data representing the resolved settings of the at least one software system or application, and selectively apply the genetic data to a corresponding software system or application stored on the destination computing platform to automatically provide similar settings thereon.

9. The system according to claim 8, wherein the migration utility is configured to compare software systems and applications stored on the destination computing platform with software systems and applications stored on the source computing platform.

10. The system according to claim 9, wherein the migration utility is configured to derive a script for each software system or application stored on the source computing platform and selected by a user.

11. The system according to claim 8, wherein the source computing platform operates according to a different operating system than the destination computing platform.

12. The system according to claim 8, wherein the source and destination computing platforms of the network communicate according to TCP/IP.

13. The system according to claim 9, wherein the network further includes a host server, the host server including a memory for storing the script data, and is being configured to transmit selected scripts from the network in response to a request from a computing platform connected to the network.

14. A system for describing a computing environment for migration over a network, wherein the network includes a source computing platform and a destination computing platform, the system comprising:
 at least one script that defines a software system or application and includes instructions for identifying the defined software system or application, and settings thereof; and
 a script engine running the at least one script, configured to scan a storage area of the source computing platform according to the instructions, and represent the defined software system or application, and settings thereof, as a genetic data file.

15. The system according to claim 14, wherein the script engine is executed by a processor configured to read the at least one script in response to a user input, and select specific software systems or applications for migration to the destination computing platform.

16. The system according to claim 15, further comprising a host server configured to store a plurality of scripts, and in response to a user request, download a selected one of the plurality of scripts to the processor.

17. The system according to claim 14, wherein the network operates according to TCP/IP.

18. The system according to claim 14, wherein the network includes a database that stores data about each software system or application stored on the source computing platform.

19. A computer program product for migrating a computing environment over a network, the computer program product for use with a computer system having a display and a user input device, the computer program product comprising:
 program code defining a process of displaying a view of a space on the display coupled to the computer system;
 program code defining a process of accepting signals from the user input device coupled to the computer system, the signals specifying a destination computing platform and a source computing platform;
 program code defining a process of deriving at least one script that defines at least one software system or application stored on the source computing platform;
 program code defining a process of parsing the script to resolve specific user-selectable settings of the at least one software system or application;
 program code defining a process of generating genetic data representing the resolved settings of the at least one software system or application;
 program code defining a process of selectively applying the genetic data to a corresponding software system or application stored on the destination computing platform to automatically provide similar settings thereon; and
 a computer-readable medium on which the program codes are stored.

20. The computer program product of claim 19, further comprising a computer-readable medium in which data about the at least one software system or application is stored, the data forming a basis for the genetic data.

21. The computer program product of claim 19, further comprising a network interface through which the genetic data is sent to the destination computing platform.

* * * * *

UNITED STATES PATENT AND TRADEMARK OFFICE
CERTIFICATE OF CORRECTION

PATENT NO.     : 6,370,646 B1
DATED          : April 9, 2002
INVENTOR(S)    : Goodman et al.

It is certified that error appears in the above-identified patent and that said Letters Patent is hereby corrected as shown below:

Column 9,
Line 31, replace "and is being configured" with -- and being configured --.

Signed and Sealed this

Twenty-second Day of April, 2003

JAMES E. ROGAN
*Director of the United States Patent and Trademark Office*